June 20, 1972  R. E. FISCHELL  3,671,286

SURFACE WITH LOW ABSORPTIVITY TO EMISSIVITY RATIO

Filed April 3, 1970

INVENTOR.
ROBERT E. FISCHELL
BY
*J. O. Tresansky*
ATTORNEY

United States Patent Office 3,671,286
Patented June 20, 1972

3,671,286
SURFACE WITH LOW ABSORPTIVITY TO EMISSIVITY RATIO
Robert E. Fischell, Silver Spring, Md., assignor to the United States of America as represented by the Secretary of the Navy
Continuation-in-part of application Ser. No. 576,796, Aug. 31, 1966. This application Apr. 3, 1970, Ser. No. 25,482
Int. Cl. B64g 1/10
U.S. Cl. 117—333                 5 Claims

ABSTRACT OF THE DISCLOSURE

A thermal surface particularly adapted for use as the exterior coating of a space vehicle or the like, and exhibiting a very low absorptivity to emissivity ratio is formed by coating a layer of material, such as glass, having a high infrared emissivity with a dielectric low-pass optical filter material effective to reflect, with minimum absorption, a substantial portion of the incident solar radiation occurring at wavelengths shorter than a predetermined value and with a second material which complements the low-pass optical filter; i.e., it has low absorptivity for and is highly reflective to the remaining portion of the incident radiation occurring at wavelengths longer than the predetermined value.

CROSS-REFERENCE TO OTHER APPLICATIONS

The present application-in-part discloses and claims subject matter disclosed in an earlier filed pending application by the same inventor, such application having Ser. No. 576,796, now abandoned, and having been filed Aug. 31, 1966.

DESCRIPTION OF THE INVENTION

The present invention generally relates to thermal surfaces and, more particularly, to an improved thermal surface exhibiting a low absorptivity to emissivity ratio particularly adapted for use as an exterior coating on an earth satellite or the like.

A continuing problem in the thermal design of earth satellites and other spacecraft is to provide an exterior surface which can effectively radiate heat generated within the satellite, while at the same time reflecting virtually all of the incident solar radiation to which the satellite is subjected when in a space environment. In other words, it is very desirable to provide a surface with a low solar absorptance to infrared emittance ratio.

The need for such a proposed surface is evidence by the excessive temperature variations often experienced within a satellite and which adversely affect the performance and reliability of electronic and mechanical components therein. This has been a serious problem on past satellites. For example, many of these satellites have utilized a white paint coating for the intended purpose of reflecting the incident solar energy, while maintaining a high infrared emissivity, so that the temperature inside of the satellite does not become excessive. However, it has been observed that the absorptivity of such paint coating increases from approximately 0.2 (at launch) to approximately 0.4 after about one year in orbit. This increase in absorptivity gives rise to excessive temperature variations within the satellite and, in many instances, has permitted the temperature of the satellite to increase to such a level that the satellite life has been seriously shortened. Moreover, a space vehicle which travels near the sun must also have a very low absorptivity to emissivity ratio coating in order to keep the internal temperatures down to a reasonable level.

With the above in mind, it is proposed in accordance with the present invention to provide an improved exterior surface or coating for spacecraft comprising a thin layer of glass or the like having a relatively high infrared emissivity (about 0.85) and capable of effectively radiating heat that is generated within the satellite. The exterior or front surface of the glass layer is then coated with a multilayer dielectric, low-pass optical interference filter which functions to reflect that portion of the incident solar radiation occurring at wavelengths shorter than a predetermined value; whereas, the underside or back surface of the glass layer is coated with a substance (e.g. silver) which complements the low-pass filter in that it is highly reflective to that portion of the incident solar energy occurring at wavelengths longer than the predetermined value mentioned above.

The front surface alone would typically have many layers and, as is well-known in the art, each alternate layer would consist of two different dielectric materials, each with a different index of refraction. The thickness of each of the layers of dielectric material is configured so that destructive and constructive optical interference will result in a frequency selective (low-pass) reflecting surface. Typical dielectric materials used for these layers are silicon monoxide, zirconium oxide, magnesium fluoride and titanium dioxide.

Both the front surface, all dielectric, multilayer filter and the glass have a high emissivity. Even though the highly reflective plating on the back or interior side of the glass might have a very low emissivity, if the thickness dimension of the glass is large compared to a wavelength of infrared light, the over-all emissivity will be high, which is required to provide a low ratio of absorptivity to emissivity for the composite device.

In practice, it has been found that the proposed coating or surface of the present invention is capable of maintaining a relatively constant absorptivity of approximately 0.05 for the expected life of a satellite. Moreover, the proposed surface will improve or lower the over-all absorption to emissivity ratio of the satellite surfacing by about a factor of five, when compared with the presently used spacecraft surfacing techniques. Consequently, there is substantially less long-term variation of the satellite internal temperature. In addition, the proposed surface of the present invention is relatively lightweight and more imprevious to handling than presently used white paints, and furthermore, the proposed surface will not alter its absorptivity or emissivity, due to extended exposure to the ultraviolet or corpuscular radiation experienced by an orbiting spacecraft.

Accordingly, one object of the present invention is to provide an improved thermal surface or coating having a low absorptivity to emissivity ratio.

Another object of the present invention is to provide an improved thermal surface or coating having a low absorptivity to emissivity ratio and which is particularly adapted for use as the exterior coating on a satellite or the like.

Another object of the present invention is to provide an improved external surface for satellites which will not change its absorptivity or emissivity values when subjected to space environment, and which is relatively lightweight and impervious to handling.

Other objects, purposes and characteristics features of the present invention will in part be pointed out as the description of the invention progresses, and in part be obvious from the accompanying drawings wherein.

Figure 1:
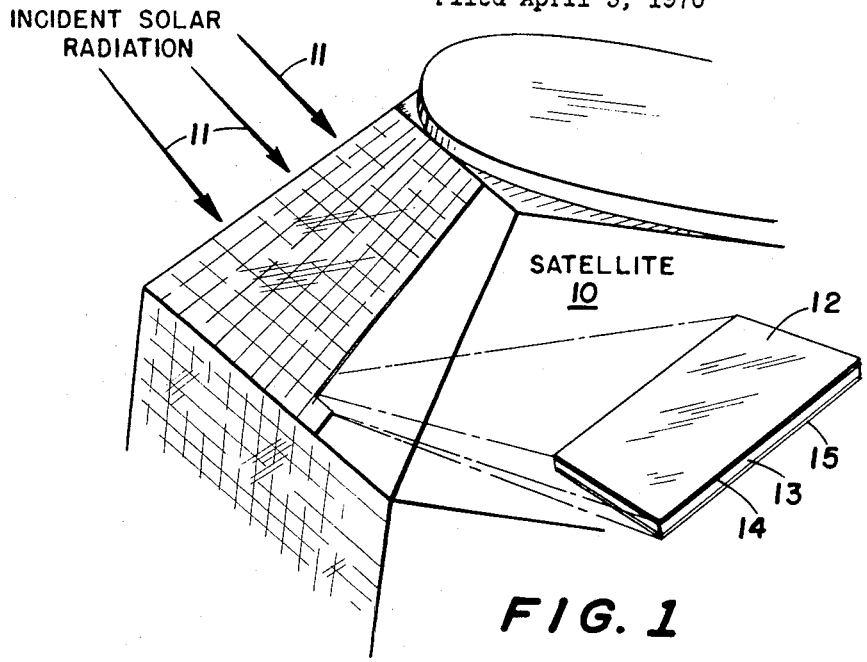
FIG. 1 is a pictorial illustration of a portion of a satellite illustrating one manner of mounting the improved surface or coating of the present invention thereon.

Referring now to the drawings, FIG. 1 illustrates one embodiment of the present invention adapted to form the exterior surface or coating of a satellite 10, for the purpose of providing temperature control. More specifically, the proposed surface of the present invention might, if desired, be bonded in the illustrated tile-like fashion to the exterior skin of the satellite 10, where it is effective to radiate heat which is generated within the satellite 10 (for example, by the electronic equipment not shown); while at the same time reflecting virtually all of the incident solar radiation to which the satellite 10 is subjected when in a space environment. This incident solar radiation is represented in FIG. 1 by the arrows 11. One of the individual tile-like blocks embodying the improved thermal surface or coating of the present invention is represented at 12 and has been enlarged for clarity. The exact size of the tiles depends upon the requirements of practice; the range of one inch square to four inches square probably being most convenient.

Figure 2:
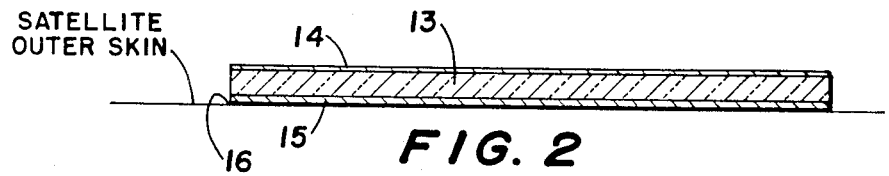
FIG. 2 is a cross-sectional view of an improved satellite coating constructed in accordance with one embodiment of the present invention.

As can best be seen in the cross-sectional view of FIG. 2, the proposed surface of the present invention comprises a thin layer 13 of glass, fused silica or like transparent material having a relatively high infrared emissivity. A typical value for the thickness of the glass layer 13 is within the range of 1 to 6 mils which is large compared to the wavelength of typical infrared light. The outermost (exterior) or front surface of the glass layer 13 is coated with a suitable multilayer interference filter 14 of two or more dielectric materials which functions as a low-pass optical filter effective to reflect, with minimum absorption, a substantial portion of the shorter wavelength energy (towards ultraviolet) contained in the incident solar radiation. As mentioned above, a number of well-known metal oxide dielectric materials are acceptable from which to form the outer coating 14 and are described on page 188 of Space Materials Handbook, Addison-Wesley Publishing Co., Inc. (1965). The interior or back surface of the glass layer 13 is then coated or plated with a layer 15 which is highly reflective to the longer wavelength energy (visible and infrared). For example, the layer 15 might be vacuum deposited silver plating. As shown in FIG. 2, the proposed thermal surface of the present invention can be bonded to the outer skin of the satellite 10 by epoxy resin 16 or the like. As is well-known to those skilled in the satellite art, the outer surface or skin of the saltellite 10 would be constructed normally of a suitable lightweight material such as Fiberglas or aluminum. For example, 0.008 inch thick Fiberglas skins were employed on past Navy TRANSIT Navigation satellites, and the so-called DME-A satellite (NASA), launched in November 1965, and the 5E-5 Navy satellite, launched in December 1964, both employed aluminum skins.

Figure 3:
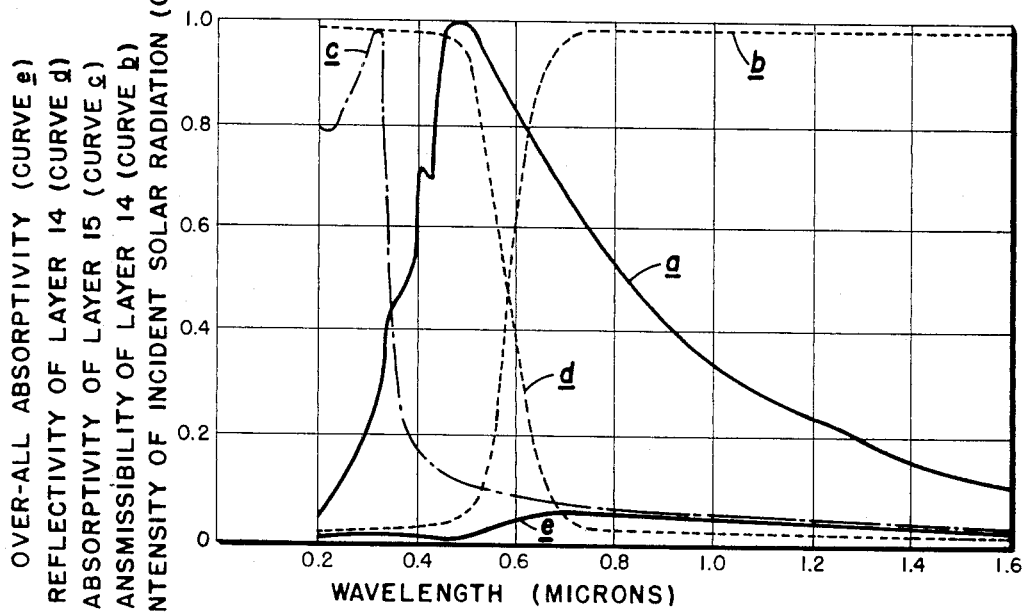
FIG. 3 is a graphic representation of the absorptivity and transmissibility properties of the embodiment shown in FIG. 2, as a function of wavelength.

Referring now to FIG. 3, curve $a$ represents the relative intensity of the solar radiation experienced by the satellite 10 when in a space environment. Curve $c$ represents the manner in which the absorptivity of the silver plating 15 varies as a function of wavelength and indicates, as is well-known, that the layer 15 is a very effective reflector of the longer wavelength energy (towards infrared) contained in the incident solar radiation 11; e.g. above 0.4 micron. If one integrates this absorptivity to sunlight over the solar spectrum, a value of approximately 0.06 is obtained for the silver plating layer 15. Curves $b$ and $d$, on the other hand, represent the typical manner in which the transmissibility and reflectivity respectively for the low-pass filter coating 14 vary as functions of incident energy wavelength when constructed, for example, of zirconium oxide and magnesium fluoride. From curves $b$ and $d$ it will be seen that the cut-off wavelength of filter coating 14 is approximately 0.5 to 0.6 micron and that the shorter wavelength energy (towards ultraviolet) contained in the incident solar radiation 11 (see FIG. 1) which might otherwise be absorbed at layer 15 is effectively reflected, with minimum absorption, by the low-pass coating 14. As a result of using the layer 14 to complement the layer 15, one can reflect nearly one-half of the solar energy which is not already reflected by the plating layer 15 and the overall absorptivity of the proposed thermal surface is thus reduced to approximately 0.04.

The absorptivity of this device at any wavelength of the incident light is determined by the product of the transmissibility of the front layer 14 (curve $b$) and absorptivity of the back surface 15 (curve $c$). As an example, at a wavelength of 0.4 micron, the transmissibility of the front layer 14 is approximately 0.03 and the absorptivity of the back surface is approximately 0.18. Therefore, at this wavelength, the net absorptivity of the device is approximately $0.03 \times 0.18 = 0.0054$. The curve $e$ in FIG. 3 thus represents the product of curves $b$ and $c$ at every wavelength; i.e. $e = b \times c$ and the effective absorptivity to sunlight for the proposed thermal surface of this invention is the average value of the curve $e$ normalized to outer space solar illumination, as indicated in curve $a$.

As a typical value, glass has an infrared emissivity of about 0.85. Since the emissivity of dielectric layer 14 is also high, the over-all emissivity value of the proposed thermal surface provided by the present invention does not vary substantially from the value of infrared emissivity for glass alone. Additionally, in view of the fact that the low-pass optical coating 14 reflects, with minimum absorption, a substantial portion of the shorter wavelength energy (i.e. it passes the longer wavelengths) in the incident solar radiation 11; whereas, the silver plating 15 reflects virtually all of the longer wavelength energy, the proposed multilayer thermal surface of the present invention has an absorptivity to emissivity ratio which remains relatively constant, at a value of approximately 0.05, for the life of the satellite 10. This value represents an improvement, by more than a factor of five, over the absorptivity to emissivity ratio presently obtainable with currently used satellite surfacing techniques. Moreover, as mentioned previously, it has been found that the white paint coating commonly used on many satellites has an initial absorptivity value of 0.2, but, which increases to approximately 0.4 after about one year in orbit and gives rise to excessive temperature variations within the satellite. On many past satellites this has permitted the internal temperature to increase to such a level that the useful satellite life has been seriously shortened.

It has also been found that, when compared to presently used paints, the proposed thermal surface of the present invention is relatively lightweight (due to its small thickness); it is more impervious to handling (in that it can be cleaned more readily); and, it is less susceptible to the ultraviolet and corpuscular radiation experienced by the satellite when in orbit.

Obviously, many modifications and variations of the present invention are possible in the light of the above teachings. For example, the low-pass optical filter coating can be disposed between the glass layer and the silver plating, if desired. It should therefore be understood that within the scope of the appended claims, the invention may be practiced otherwise than as specifically described.

What is claimed is:

1. A thermal surface with low absorptivity to emissivity ratio and adapted for use as the exterior coating of a space vehicle or the like comprising, in combination,
   a layer of transparent material having a high infrared emissivity,
   a first coating of dielectric material carried on one surface of said high emissivity layer and forming a low-pass optical filter to incident radiation effective to reflect with minmum absorption that portion of said incident radiation at wavelengths shorter than a predetermined value of approximately 0.5 to 0.6 micron, and a second coating of material disposed on an opposed surface of said high emissivity layer relative to said first coating so as to receive the radiation passed by said first coating and being effective to reflect with minimum absorption that portion of said incident radiation at wavelengths longer than said predetermined value.

2. The thermal surface specified in claim 1 wherein said high emissivity layer is a layer of glass having a thickness in the range of 1 to 6 mils.

3. The thermal surface specified in claim 1 wherein said second coating is silver plating.

4. The thermal surface specified in claim 2 wherein said first coating is affixed to the front or exterior surface of said glass layer and comprises a dielectric, low-pass optical interference filter having a cut-off wavelength of approximately 0.5 to 0.6 micron and said second coating is silver plating affixed to the rear of interior surface of said glass layer.

5. The thermal surface specified in claim 1 wherein said first coating is characterized by,
  (a) high transmissibility, low reflectivity and low absorptivity in the infrared portion of said incident radiation,
  (b) decreasing transmissibility, increasing reflectivity and low absorptivity in the visible portion of said incident radiation, and
  (c) low transmissibility, high reflectivity and low absorptivity in the ultraviolet portion of said incident radiation,
and wherein said second coating is characterized by,
  (d) low absorptivity and high reflectivity in the visible and infrared portions of said incident radiation.

References Cited
UNITED STATES PATENTS

| | | | |
|---|---|---|---|
| 3,149,989 | 9/1964 | Johnson | 117—33.3 X |
| 3,082,510 | 3/1963 | Kelly et al. | 117—33.3 X |
| 3,069,301 | 12/1962 | Buckley et al. | 117—33.3 X |
| 2,628,927 | 2/1953 | Colbert et al. | 117—124 X |
| 2,676,117 | 4/1954 | Colbert et al. | 117—124 X |
| 2,456,241 | 12/1948 | Axler et al. | 117—33.3 |
| 2,564,708 | 8/1951 | Mochel | 117—33.3 X |
| 2,757,104 | 7/1956 | Howes | 117—71 X |
| 3,130,940 | 4/1964 | Erb et al. | 117—33.3 X |
| 3,174,537 | 3/1965 | Meyer | 117—33.3 X |
| 3,294,513 | 12/1966 | Beattie | 117—33.3 X |
| 3,384,324 | 5/1968 | O'Sullivan | 117—33.3 X |

FOREIGN PATENTS

| | | | |
|---|---|---|---|
| 234,214 | 6/1961 | Australia | 117—33.3 |
| 559,865 | 3/1944 | Great Britain | 350—1 |
| 1,033,681 | 6/1966 | Great Britain | 117—33.3 |

OTHER REFERENCES
"Interference Reflectance Filter UV–R–250," Jenaer Glaswerk, 4 pages.

MURRAY KATZ, Primary Examiner

M. R. P. PERRONE, Jr., Assistant Examiner

U.S. Cl. X.R.

117—68, 71 R, 106; 350—1, 164, 165, 166